United States Patent
Kresca et al.

(10) Patent No.: US 9,577,558 B2
(45) Date of Patent: Feb. 21, 2017

(54) POWER MANAGEMENT SYSTEM HAVING AUTOMATIC CALIBRATION

(71) Applicant: Caterpillar Inc., Peoria, IL (US)

(72) Inventors: Michael James Kresca, Peoria, IL (US); Brett Michael Nee, Germantown Hills, IL (US); Matthew J. Urbanc, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 83 days.

(21) Appl. No.: 14/323,691

(22) Filed: Jul. 3, 2014

(65) Prior Publication Data

US 2016/0006383 A1   Jan. 7, 2016

(51) Int. Cl.
  *H02P 9/04* (2006.01)
  *H02P 9/48* (2006.01)

(52) U.S. Cl.
  CPC ..................... *H02P 9/48* (2013.01)

(58) Field of Classification Search
  CPC ............... H02P 9/04; H02P 9/008; H02P 9/10; H02P 9/107; H02P 9/48
  USPC .......................................................... 322/15
  See application file for complete search history.

(56) References Cited

U.S. PATENT DOCUMENTS

| | | |
|---|---|---|
| 5,311,063 A | 5/1994 | Hubler |
| 5,376,877 A | 12/1994 | Kern et al. |
| 5,467,008 A | 11/1995 | Uchinami |
| 5,483,146 A * | 1/1996 | Schultz ................. H02J 7/1438 322/29 |
| 5,818,117 A | 10/1998 | Voss et al. |
| 5,929,609 A | 7/1999 | Joy et al. |
| 6,118,186 A * | 9/2000 | Scott .......................... H02P 9/04 290/1 A |
| 6,274,944 B1 * | 8/2001 | Letang .................. F02D 41/083 123/331 |
| 6,750,636 B2 * | 6/2004 | Hocken ..................... H02P 9/14 290/5 |
| 7,026,724 B1 | 4/2006 | Blackburn |
| 7,336,000 B2 * | 2/2008 | Stahlhut .................... F01N 5/04 290/40 C |
| 8,102,066 B2 * | 1/2012 | Hashimoto ............. F02D 29/06 290/40 C |
| 8,140,240 B2 * | 3/2012 | Molen ..................... F02D 29/02 123/399 |
| 8,560,201 B2 | 10/2013 | Morrow et al. |
| 2001/0024107 A1 * | 9/2001 | Jabaji ...................... H02K 19/34 322/46 |

(Continued)

FOREIGN PATENT DOCUMENTS

WO   WO 2011/119161   9/2011

*Primary Examiner* — Viet Nguyen
(74) *Attorney, Agent, or Firm* — Caterpillar Inc.; James Bennin (57) ABSTRACT

A power management system having automatic calibration is disclosed. The power management system may have an alternator and an electronic control unit. The electronic control unit may be configured to determine a reference voltage based on at least one measured operating condition of the alternator. The reference voltage may correspond to an overloading threshold of the alternator. The electronic control unit may be further configured to monitor a voltage of the alternator and, when the monitored voltage is less than the reference voltage, perform a corrective action to increase a power output of the alternator.

17 Claims, 5 Drawing Sheets

(56) References Cited

U.S. PATENT DOCUMENTS

| | | | |
|---|---|---|---|
| 2002/0043961 A1* | 4/2002 | Watanabe | H02P 9/305 322/28 |
| 2004/0019441 A1 | 1/2004 | Larson | |
| 2004/0113592 A1* | 6/2004 | Adams | H02H 7/065 322/27 |
| 2004/0238243 A1 | 12/2004 | King et al. | |
| 2007/0210583 A1* | 9/2007 | Stahlhut | H02P 9/305 290/52 |
| 2007/0252560 A1* | 11/2007 | Laufenberg | H02P 9/48 322/23 |
| 2008/0309094 A1 | 12/2008 | Molen et al. | |
| 2009/0134845 A1 | 5/2009 | Czajkowski | |
| 2009/0206667 A1* | 8/2009 | Holliday | F02G 1/0435 307/48 |
| 2010/0007313 A1* | 1/2010 | Jakeman | H02P 9/10 322/86 |
| 2012/0139264 A1* | 6/2012 | Riihimaki | H02P 9/04 290/40 B |
| 2012/0153904 A1* | 6/2012 | Albsmeier | H02P 9/04 322/28 |
| 2013/0106118 A1* | 5/2013 | Koenen | H02P 9/04 290/40 B |
| 2013/0158776 A1 | 6/2013 | Rini et al. | |
| 2014/0203788 A1* | 7/2014 | Andrejak | H02P 9/04 322/14 |
| 2014/0225575 A1* | 8/2014 | Andrejak | H02P 9/04 322/28 |

\* cited by examiner

POWER MANAGEMENT SYSTEM HAVING AUTOMATIC CALIBRATION

TECHNICAL FIELD

The present disclosure is directed to a power management system and, more particularly, to an adaptive power management system with automatic calibration.

BACKGROUND

Some machines, including many mobile machines, include a power system that supplies electricity to various electrical systems and components, such as starters, lighting components, relays, heating and cooling components, electronic control units, etc. In many of these machines, an alternator supplies the electricity to meet the electrical load created by these components. In some instances, a battery also provides electricity when a total electrical load is greater than what the alternator alone is capable of supplying at that time. For example, since alternator output may vary with a speed of the alternator, a battery may supplement power when the alternator is at low speeds. Use of the battery to supplement electricity in this manner, however, results in high battery drain and has a negative impact on battery life.

One attempt to reduce the use of a battery to supplement power is described in U.S. Pat. No. 8,140,240, which issued to Molen et al. on Mar. 20, 2012 ("the '240 patent"). The '240 patent describes a speed control system that adjusts the speed of a vehicle's engine to change an alternator's speed to meet a desired electrical output. In particular, an electronic controller calculates a current electrical load, and determines an appropriate alternator speed for the given conditions based on a relationship between the alternator's speed and load capability.

While the speed control system of the '240 patent may alleviate some strain on a battery in a power system, it may be less than optimal. In particular, use of the system may be complicated because it relies on user-input calibration values to account for variance between different machines. This may require additional effort to determine the calibration values for each machine prior to use of the system, and may not account for unknown variations that occur during operation. In particular, the system may not account for manufacturing variance and harness losses that may cause measured values to be different than actual conditions.

The present disclosure is directed to overcoming one or more of the problems set forth above and/or other problems of the prior art.

SUMMARY

In one aspect, the present disclosure is directed to a power management system. The power management system may include an alternator and an electronic control unit. The electronic control unit may be configured to determine a reference voltage based on at least one measured operating condition of the alternator. The reference voltage may correspond to an overloading threshold of the alternator. The electronic control unit may be further configured to monitor a voltage of the alternator and, when the monitored voltage is less than the reference voltage, perform a corrective action to increase a power output of the alternator In another aspect, the present disclosure is directed to a method of managing the power output of an alternator. The method may include determining a reference voltage based on at least one measured operating condition of the alternator. The reference voltage may be an overloading threshold of the alternator. The method may further include monitoring a voltage of the alternator, and, when the monitored voltage is less than the reference voltage, increasing a speed of the alternator to increase the power output of the alternator In yet another aspect, the present disclosure is directed to a machine. The machine may include an engine and an alternator operably coupled to the engine. The machine may further include an electronic control unit configured to determine a reference voltage based on at least one measured operating condition of the alternator. The reference voltage may be an overloading threshold of the alternator. The electronic control unit may be further configured to monitor a voltage of the alternator, and when the monitored voltage of the alternator is less than the reference voltage, increase a speed of the engine to increase a power output of the alternator. In addition, determining the reference voltage based on the at least one measured operating condition of the alternator may include determining that the alternator is operating according to a capability condition, determining an operating voltage of the alternator that corresponds to the alternator operating according to the capability condition, and determining the reference voltage based on the operating voltage. The capability condition may be an operating condition that indicates the alternator is supplying enough power to meet all electrical loads on the alternator.

DETAILED DESCRIPTION

Figure 1:
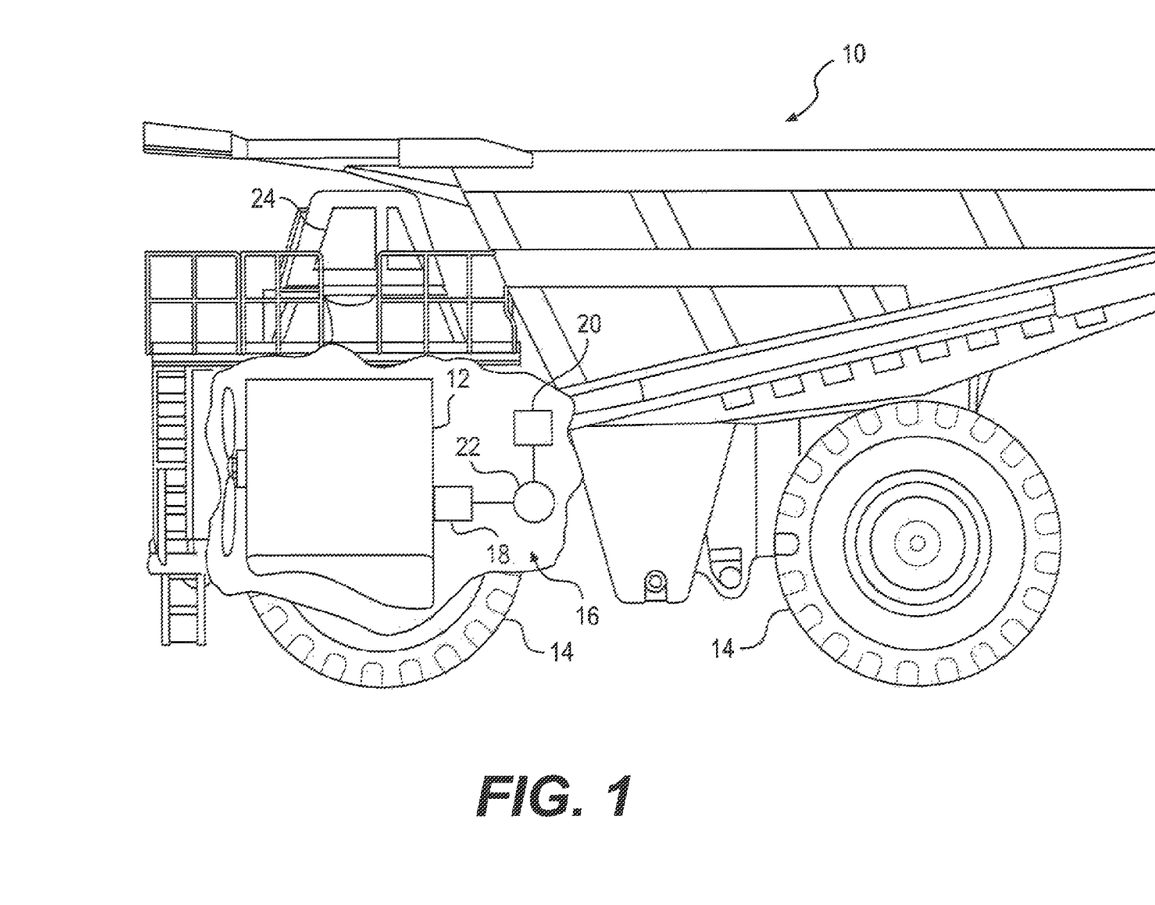
FIG. 1 is a pictorial illustration of an exemplary disclosed machine.

FIG. 1 illustrates an exemplary machine 10 having multiple systems and components that cooperate to accomplish a task. The machine 10 may embody a mobile machine that performs some type of operation associated with an industry such as mining, construction, farming, transportation, or another industry known in the art. For example, the machine 10 may be a material moving machine such as a large mining truck, a dozer, a motor grader, a snow plow, or similar machine. The machine 10 may include an engine 12. The engine 12 may be a combustion engine, such as a diesel, natural gas, or dual-fuel engine. It should be understood, however, that the engine 12 may be any type of engine or other power source configured to generate mechanical output.

The engine 12 may provide power to various systems and components of the machine 10. For example, the engine 12 may be connected to drive one or more traction devices 14, thereby propelling machine 10. The traction devices 14 may include wheels located on each side of the machine 10 (only one side shown). Alternatively, the traction devices 14 may include tracks, belts, or other known traction devices. It is contemplated that any of the traction devices 14 on the machine 10 may be driven and/or steered, in a manner known in the art.

In an exemplary embodiment, the engine 12 may be a component of or be connected to a power management system 16. The power management system 16 may be configured to control and manage the supply of power to various systems and components of the machine 10. In one embodiment, the power management system 16 may control and manage the supply of electricity to electrical systems and components of the machine 10. In an exemplary embodiment, the power management system 16 may include an alternator 18 and a battery 20. One or more of the alternator 18 and the battery 20 may supply electricity sufficient to meet an electrical load 22.

Electrical load 22 may vary depending on the operation of the machine 10. For example, various electrical systems and components, such as starters, relays, heating systems, cooling systems, lighting systems, electronic control units, and the like, may demand power at different times depending on different conditions. For instance, the machine 10 may include an operator station 24 that includes a plurality of controls that allow an operator to control operation of the machine 10 and one or more electrical systems and/or components thereof. The operator station 24 may include, for example, controls that allow an operator to start the machine 10, turn on lights, turn on a heating system and/or air conditioning system, etc., in a manner known in the art. In another example, the machine 10 may include various additional electrical systems and components that may operate (e.g., turn on/off) automatically depending on operating conditions at that time. For example, the machine 10 may include one or more heating systems that automatically turns on in cold conditions to prevent freezing in and around the engine 12.

When in operation, each electrical system and/or component of the machine 10 may draw power from the power management system 16, creating an individual electrical load on the power management system 16. The electrical systems and/or components operating and drawing power at a particular time may combine to form the electrical load 22. Thus, the electrical load 22 may vary over time, depending on the electrical systems and components drawing power at any given time, which may depend on various operating conditions of the machine 10.

Figure 2:
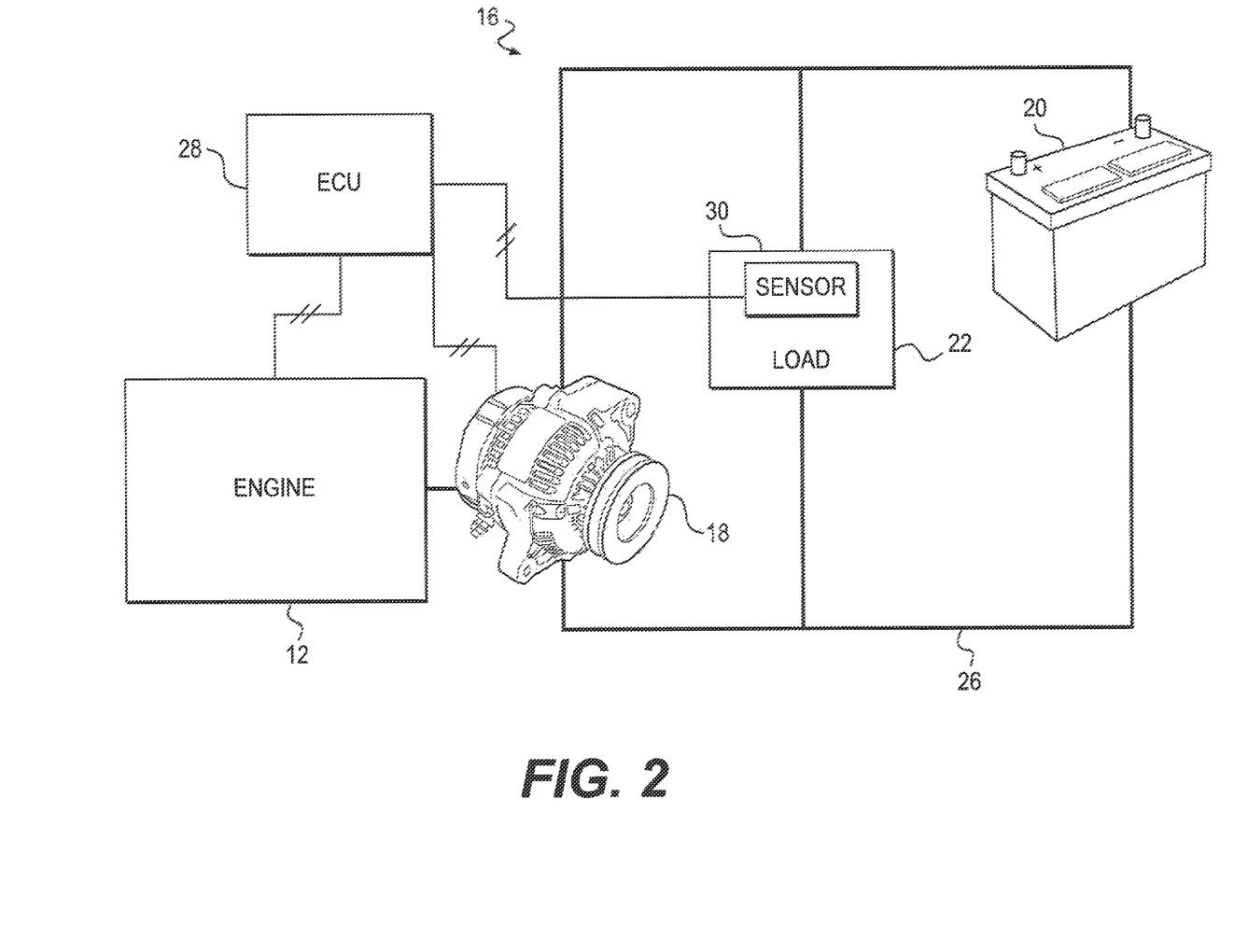
FIG. 2 is a schematic illustration of an exemplary disclosed power management system that may be utilized with the machine of FIG. 1.

FIG. 2 depicts the power management system 16 in more detail. The power management system 16 includes alternator 18 and battery 20, which may supply electricity to meet the electrical load 22 through a circuit 26. The circuit 26 may include one or more electrical connections that allow electrical current to flow from the alternator 18 and/or the battery 20 to a respective electrical component to provide power to that component. For example, the circuit 26 may include an electrical connection from the alternator 18 and/or the battery 20 to a heating device that allows for the supply of on-demand power to the heating device. It should be understood that the circuit 26 may be configured in any manner known in the art and may vary depending on a configuration of the machine 10.

In an exemplary embodiment, the alternator 18 may be operably coupled to the engine 12. For example, the engine 12 may be configured to cause rotation of one or more components of the alternator 18. The alternator 18 may be any machine alternator known in the art that is configured to convert the mechanical input from the engine 12 into electricity. For example, the alternator 18 may include a rotor assembly coupled to a rotating shaft of the engine 12 and configured to rotate within a stator assembly to generate electrical energy in a manner known in the art.

As is known in the art, power output of the alternator 18 may depend on a speed of the alternator. For example, the alternator 18 may be capable of producing more power when the alternator 18 is at high speeds that when the alternator is at low speeds. As used herein, speed of an alternator may refer to any speed associated with an alternator and having a relationship with power output. For example, speed of alternator 18 may refer to a rotational speed of a rotor turning within a stator.

Further, the speed of the alternator 18 may have a relationship with a speed of the engine 12. For example, due to the mechanical coupling of engine 12 and alternator 18, an increase in speed of the engine 12 may cause an increase in the speed of the alternator 18. In this way, a speed of alternator 18 may be controlled through speed control of the engine 12.

The alternator 18 may be configured to supply generated electrical energy to meet the electrical load 22 in the form of electrical current supplied through the circuit 26. While one alternator is shown as the alternator 18 in FIGS. 1 and 2, it should be understood that any number of alternators may be included with machine 10 and connected to circuit 26 (or another electrical circuit).

The battery 20 may be any battery known in the art configured to store energy and supply electricity (e.g., through the circuit 26). In an exemplary embodiment, the battery 20 may be a rechargeable battery configured to supply power to the electrical load 22 and store power received from the alternator 18. In an exemplary embodiment, the battery 20 may be configured to supply power to the electrical load 22 when the alternator 18 cannot supply enough power on its own. For example, when the engine 12 is off (and the alternator 18 is not generating electricity), the battery 20 may supply power to a starter to start the engine 12.

In another example, the battery 20 may be configured to supply power to the electrical load 22 when the alternator 18 cannot output enough electricity to meet the electrical load 22 alone. This scenario is undesirable, however, as it causes an excessive drain on the battery 20 and has a negative impact on battery life. In an exemplary embodiment, the power management system 16 may be configured to implement a control strategy to help ensure the alternator 18 produces enough power and thereby reduce the need for the battery 20 to supply power to meet the electrical load 22.

In an exemplary embodiment, the power management system 16 may further include an electronic control unit (ECU) 28 configured to control one or more components of power management system 16. The ECU 28 may embody a single or multiple microprocessors, field programmable gate arrays (FPGAs), digital signal processors (DSPs), etc., that include a means for controlling an operation of the engine 12 and/or individual engine components. For example, ECU 28 may be configured to control the power management system 16 based upon a control program stored in a memory of the ECU 28.

Numerous commercially available microprocessors can be configured to perform the functions of the ECU 28. It should be appreciated that the ECU 28 could readily embody a general engine microprocessor capable of controlling numerous system functions and modes of operation. Various other known circuits may be associated with the ECU 28, including power source circuitry, signal-conditioning circuitry, actuator driver circuitry (i.e., circuitry powering solenoids, motors, or piezo actuators), communication circuitry, timer circuitry, and other appropriate circuitry.

In an exemplary embodiment, the ECU 28 may be configured to monitor one or more operating conditions of the machine 10. For example, the ECU 28 may be electronically connected to one or more sensors 30. The sensor 30 may be arranged to monitor an operating condition of the machine 10 and transmit associated information to the ECU 28. In an exemplary embodiment, the sensor 30 may monitor an operating condition associated with the power management system 16.

In one embodiment, the sensor 30 may be a voltage sensor configured to measure an output voltage of the alternator 18. As shown in FIG. 2, the sensor 30 may be arranged as part of the electrical load 22. However, it should be understood that the sensor 30 may be configured in any manner to measure the output voltage of the alternator 18. In another example, the sensor 30 may be configured to additionally or alternatively measure another operating condition, such as a value associated with the electrical load 22 (e.g., an amount of electrical current required to meet the electrical load 22), in yet another example, the sensor 30 may include a speed sensor configured to determine a speed of the engine 12 and/or the alternator 18.

The one or more sensors 30 may be configured to measure a respective operating condition and transmit a value associated with the operating condition to the ECU 28. In this way, the ECU 28 may monitor various operating conditions of the power management system 16, it should be understood that the ECU 28 and the sensor 30 may have any configuration that provides an operating condition measurement to the ECU 28. For example, in some embodiments, the sensor 30 may be a component of the ECU 28, such as in embodiments in which the ECU 28 is connected as part of the electrical load 22. In other embodiments, ECU 28 may itself be a sensor configured to measure an operating condition and also include the sensor 30 electronically connected to measure another operating condition.

Based on measured conditions, the ECU 28 may be configured to control a speed of the alternator 18 to control the power output of the alternator 18 to meet the electrical load 22. For example, the ECU 28 may be configured to perform a power management process to perform a corrective action when the alternator 18 is not generating enough electricity to meet the electrical load 22.

In some instances, accuracy of the power management process may depend on measured values corresponding to operating conditions of the power management system 16. In an exemplary embodiment, the ECU 28 may be configured to perform an alternator autolearn process to automatically calibrate measured values corresponding to operating conditions for use in the power management process. These processes are described in more detail below.

INDUSTRIAL APPLICABILITY

The disclosed power management system may be used with any machine having an alternator that supplies power to meet an electrical load. The disclosed power management system may be particularly useful in a system that also includes a battery (or other power source) that may also provide power to meet the electrical load, such as when power generated by the alternator alone is insufficient. The disclosed power management system helps to prevent draining of the battery by performing a power management process that controls a speed of the alternator and thus a power output of the alternator) to help minimize power supplied by the battery. In addition, the disclosed power management system may be configured to automatically calibrate system measurements to help promote accuracy and effectiveness of the power management process. In this way, the disclosed power management system may be adaptable to any machine configuration.

As will be described, the power management system 16 may control a speed of the alternator 18 based on a determination that the electrical load 22 is greater than what the alternator 18 alone can supply at that time (i.e., a determination that the alternator 18 is overloaded). In an exemplary embodiment, the ECU 28 may monitor operating conditions to determine that the alternator 18 is overloaded. One manner in which the ECU 28 may determine that the alternator 18 is overloaded is to monitor a voltage output of the alternator 18. It has been determined that when an electrical load on an alternator exceeds a capability of the alternator at the time the load is applied, a steep drop in alternator output voltage occurs. Thus, by monitoring an output voltage of the alternator 18, the ECU 28 can determine that the alternator 18 is overloaded, and that a corrective action is necessary to increase the power output of the alternator 18. For example, the ECU 28 may increase a speed of the alternator 18 to increase the power output of the alternator 18 to meet the electrical load 22.

In one embodiment, in order to determine whether an output voltage of the alternator 18 indicates that the alternator 18 is overloaded, the ECU 28 may monitor the output voltage and determine when the output voltage falls below an overloading threshold. In an exemplary embodiment, the overloading threshold may be a threshold voltage value, where measured voltage values that are less than the overloading threshold are indicative of overloading of the alternator 18. For example, if the alternator 18, when not overloaded, operates within a normal voltage range of 27-29 V, the overloading threshold may be approximately 27 V, since a drop in output voltage below the normal voltage range indicates that the alternator 18 is overloaded.

Determination of a threshold voltage value for use as an overloading threshold may depend on a number of factors. In particular, the normal voltage range of an alternator may depend on the type and size of the alternator, and/or the number of alternators in the system. Thus, a given voltage value may be outside of a normal voltage range for one alternator, but within the normal voltage range for another. In addition, it has been determined that various measurement factors may affect voltage values that are measured by an ECU. For example, manufacturing and/or configuration variance from one alternator and ECU to another may cause measured voltage values to differ from actual conditions. Thus, an ECU measured voltage value may differ from an actual output voltage of an alternator.

Figure 3:
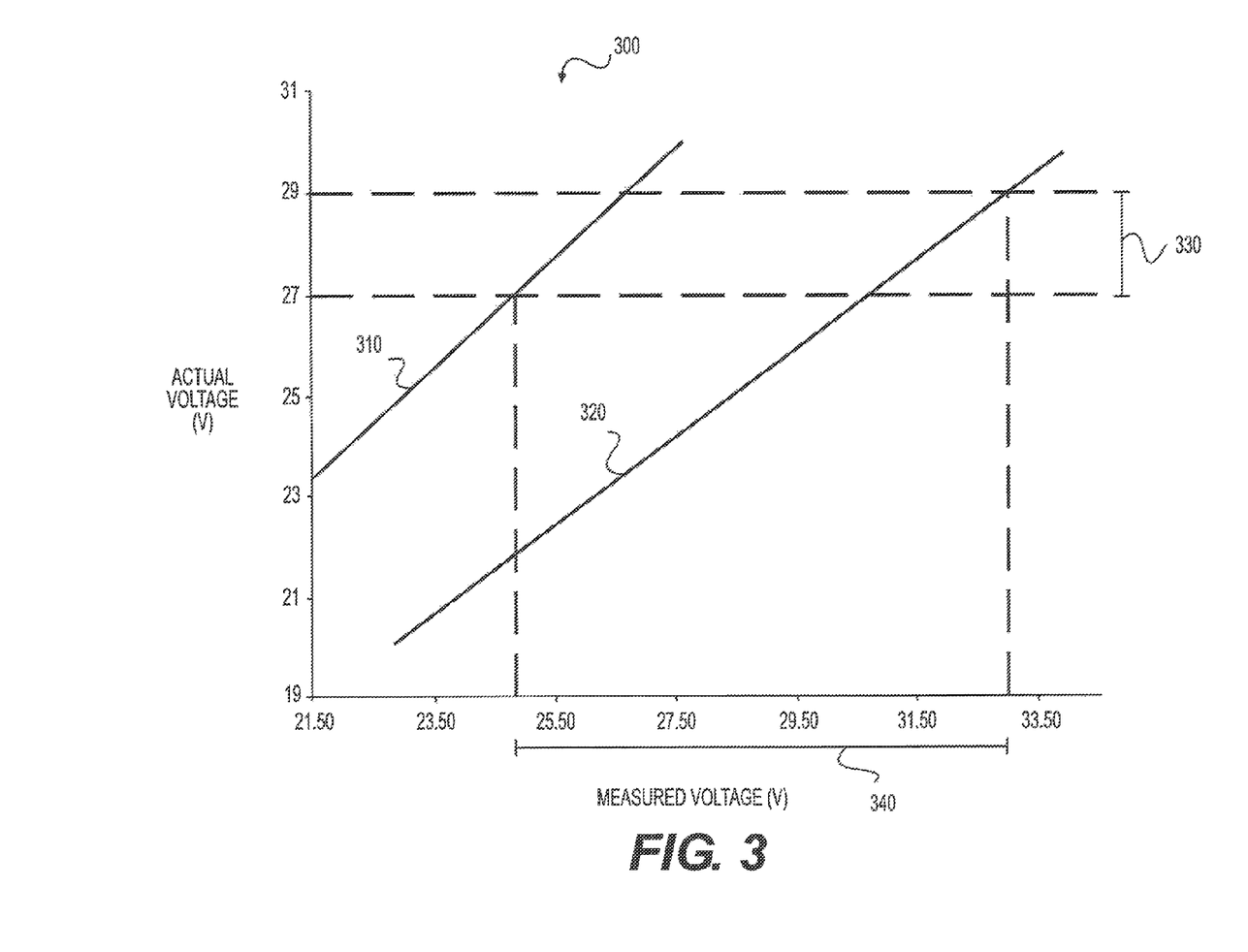
FIG. 3 is a graph depicting an exemplary relationship between actual voltage and measured voltage.

FIG. 3 is a graph 300 of exemplary relationships between actual voltage of an alternator and possible corresponding voltage values that may be measured by an ECU, depending on a particular configuration and error rate. Various factors, such as manufacturing variance between multiple alternators and multiple ECUs, harness losses, circuit configurations, etc., may cause an inaccuracy between the measured voltage and the actual voltage.

A line 310 represents a possible maximum low-side error that may result in a measured voltage being less than the actual voltage output of the alternator. A line 320 represents a possible maximum high-side error that may result in a measured voltage being greater than the actual voltage output of the alternator. It should be understood that the lines 310 and 320 are exemplary of variance across one exemplary type of machine and power management system (e.g., an alternator and ECU configuration in a large mining truck) and may vary depending on machine configuration. It could be expected that for a system represented by graph 300, a measured voltage would fall on or between the lines 310 and 320.

In an exemplary embodiment, the alternator 18, which may correspond to the relationships shown in the graph 300, may operate within as normal voltage range 330 when the alternator is not overloaded, which in this case is 27-29 V. The ECU 28 may measure the output voltage of the alternator 18 to compare the voltage to an overloading threshold to determine whether the alternator is overloaded. As described above, an exemplary overloading voltage may be approximately 27 V for an alternator with the normal voltage range 330.

However, as shown in FIG. 3, various factors may cause measured voltage values to be within a measured voltage range 340 that is different than the normal voltage range 330. For example, as shown in FIG. 3, an actual voltage that falls within normal voltage range 330 of 27-29 V may be measured as a voltage value anywhere between approximately 25.1 V and approximately 33.2 V. Thus, it may be necessary to consider a possible measurement error when determining an overloading threshold, such as to help promote accurate operation of the power management system 16 (e.g., prevent the ECU 28 from determining that the alternator 18 is overloaded when it is not, and vice versa).

Figure 4:
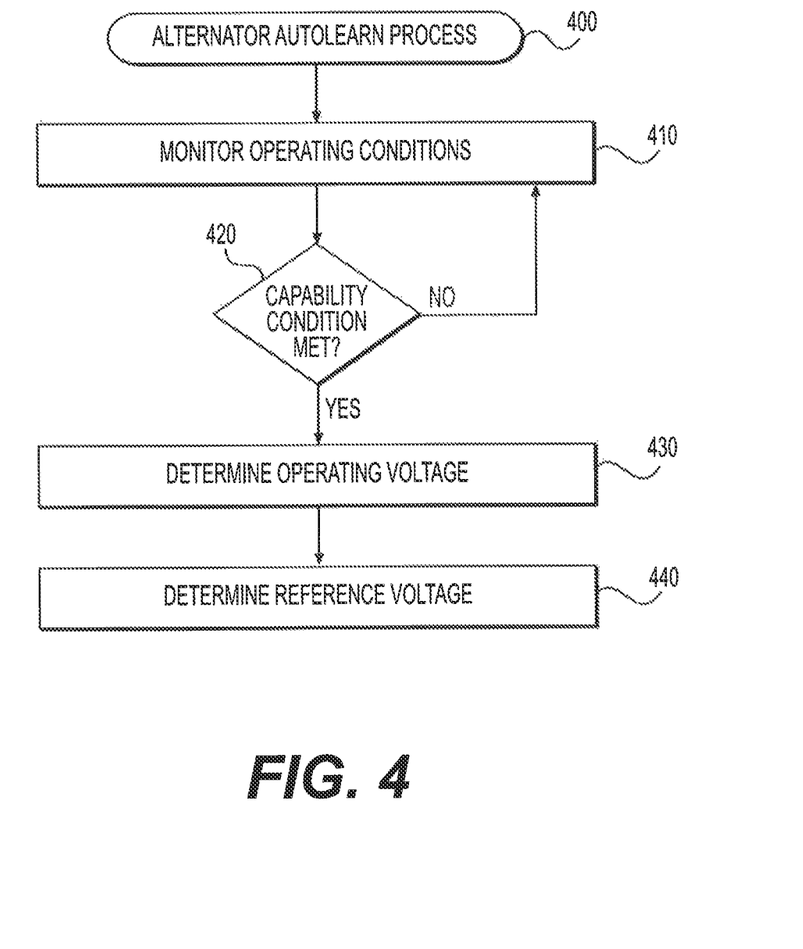
FIG. 4 is a flowchart of an exemplary alternator autolearn process.

In an exemplary embodiment, the ECU 28 may be configured to perform an alternator autolearn process to determine an overloading threshold for the alternator 18 that takes into account any variance, errors, and/or losses that may cause measured voltage values to be different than actual output voltages of alternator 18. FIG. 4 is a flowchart of an exemplary alternator autolearn process 400, consistent with disclosed embodiments. In one embodiment, the ECU 28 may execute software instructions stored in an associated memory to perform process 400 to determine a reference voltage that corresponds to an overloading threshold for the alternator 18.

The ECU 28 may monitor one or more operating conditions (step 410). For example, the ECU 28 may receive signals from the one or more sensors 30, the signals being indicative of one or more corresponding operating conditions of the machine 10. For instance, the ECU 28 may monitor and receive signals corresponding to a speed of the alternator 18, an amount of the electrical load 22, an output voltage of the alternator 18, and/or the like. The ECU 28 may receive a value indicative of the operating condition (e.g., speed value in RIM, electrical load value in amps, output voltage in volts, etc.).

The ECU 28 may compare monitored operating conditions to one or more stored capability conditions (step 420). As used herein, a capability condition may be a measured condition that indicates that the alternator 18 is supplying enough power to meet all electrical loads on the alternator 18, and thus is not overloaded at that time. For example, a capability condition may indicate that the alternator 18 is producing enough power to meet the electrical load 22, and, thus, supplemental power from the battery 20 is not necessary.

One example of a capability condition may include the alternator 18 operating with a speed that is within a capability range, or above a capability threshold (e.g., a rated speed range or speed value at which the alternator 18 produces enough power to meet any electrical load that the machine 10 might produce during normal operation). In an exemplary embodiment, the alternator 18 may have a capability range of approximately two-five times an alternator idling speed (i.e. a normal speed of the alternator 18 when the engine 12 is idling). Thus, the capability condition may be a speed of an alternator within a range of approximately two-five times the alternator idling speed, or above the threshold of approximately two times the alternator idling speed. It should be understood, however, that other ranges may be possible, such as two-three times and/or four-five times the alternator idling speed, depending on a configuration of the alternator 18. In one example, the alternator 18 may have a capability range of approximately 3400-3600 RPM and a capability threshold of 3400 RPM.

Another example of a capability condition may include a load that is less than a capability threshold, such as a minimum load that the alternator 18 is able to meet even under minimum power output conditions, such as during idling of the engine 12. The ECU 28 may compare a value associated with a measured operating condition to a stored value associated with a capability condition to determine whether the capability condition is met.

If a capability condition is not met (step 420—NO), process 400 may return to step 410, where the ECU 28 will continue to monitor operating conditions. If the capability condition is met (step 420—YES), the ECU 28 may determine an operating voltage of the alternator 18. The operating voltage of the alternator 18 may correspond to a normal operating output voltage of the alternator 18 at a time when a capability condition is met. In this way, the operating voltage may represent an output voltage that may be measured by the ECU 28 when the alternator 18 is not overloaded.

The ECU 28 may determine the operating voltage by communicating with the sensor 30, which may include a voltage sensor that measures a voltage value corresponding to an output voltage of the alternator 18 and provides the voltage value to the ECU 28. In one example, the ECU 28 may determine the operating voltage to be the measured voltage received after determining that a capability condition is met. In another example, the ECU 28 may measure a plurality of voltages while the alternator 18 operates according to a capability condition for a predetermined period of time, and determine an average of the measured voltages. For example, the ECU 28 may determine a running average of output voltages over a period of approximately thirty seconds while the alternator 18 operates with a speed in a capability range, and set that value as the operating voltage of the alternator 18.

After the operating voltage has been determined, the ECU 28 may determine a reference voltage based on the operating voltage (step 440). The reference voltage may be similar to the operating voltage, but may take into account variations away from the operating voltage that may occur during normal operation of the alternator 18. For example, the ECU 28 may determine a reference voltage based on the operating voltage and one or more tolerance factors. In one example, a tolerance factor may be determined based on a range of normal output voltage variation of the alternator 18. For example, for an alternator with a normal voltage range that spans approximately 2 V (e.g., 27-29 V), a tolerance factor of 1 V may be used to determine a reference voltage. It should be understood, however, that other tolerance factors may be used, depending on the particular configuration of components included with the power management system 16.

In an exemplary embodiment, the ECU 28 may perform the process 400 to determine a reference voltage, which may correspond to an overloading threshold for the alternator 18 since the reference voltage is determined based on an operating voltage that is measured while it is known that the alternator 18 is not overloaded. Thus, measured voltage values below the reference voltage may indicate that the alternator 18 is overloaded. Further, since the ECU 28 may determine the reference voltage based on measured operating conditions, the determination takes into account any errors and/or variance that may cause measured values to be different than actual operating conditions. In this way, the ECU 28 may automatically calibrate an overloading threshold and accurately determine whether the alternator 18 is producing enough power to meet the electrical load 22 or is overloaded.

Figure 5:
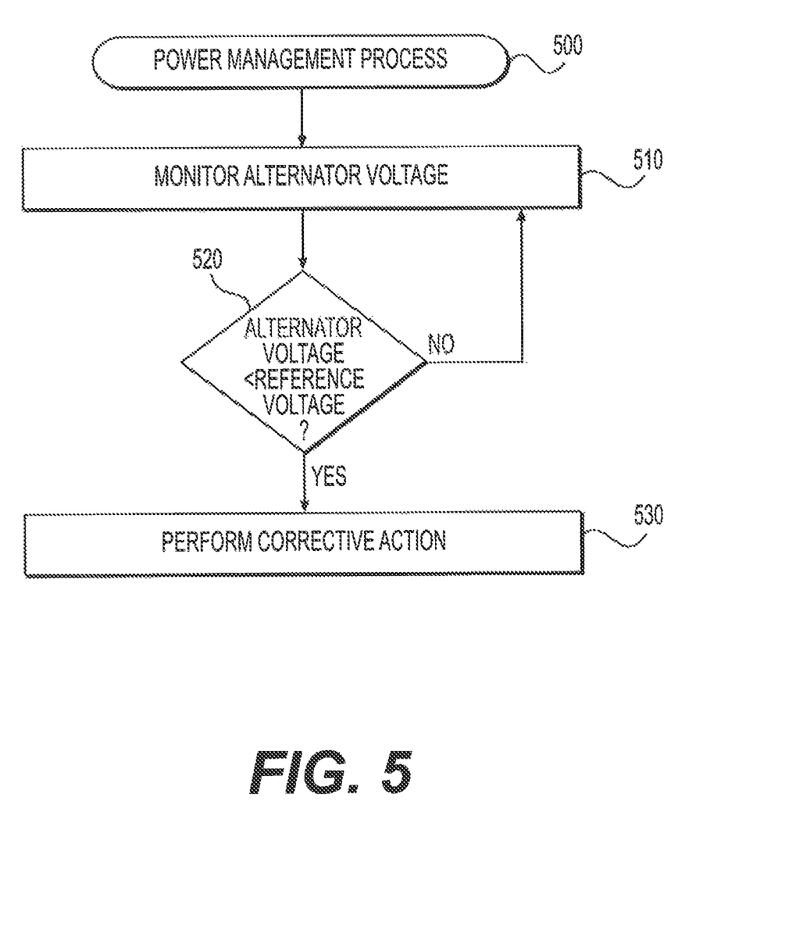
FIG. 5 is a flowchart of an exemplary power management process.

With the overloading threshold accurately determined as a reference voltage, the ECU 28 may subsequently perform a power management process to control the alternator 18 to produce enough power to meet the electrical load 22. FIG. 5 is a flowchart of an exemplary power management process 500, consistent with disclosed embodiments. In one embodiment, the ECU 28 may execute software instructions to perform the process 500 to perform a corrective action to increase a power output of the alternator 18 when the electrical load 22 is greater than what the alternator 18 is producing at the time (e.g., when the alternator 18 is overloaded).

The ECU 28 may perform the process 500 by monitoring a voltage of the alternator 18 (step 510). For example, the sensor 30 may include a voltage sensor configured to provide a voltage signal to the ECU 28. The ECU 28 may monitor the voltage signal to monitor an output voltage of the alternator 18 over time.

In addition, the ECU 28 may compare measured voltages to a stored reference voltage (step 520). In an exemplary embodiment, the stored reference voltage may have been previously determined using the process 400 and stored in a memory associated with the ECU 28. As described above, the stored reference voltage may be an overloading threshold of the alternator 18, where measured voltage values that are less than the reference voltage may indicate that the alternator 18 is overloaded.

If the ECU 28 determines that a measured alternator voltage is greater than the stored reference voltage (step 520—NO), the process 500 may return to step 510, where the ECU 28 may continue to monitor a voltage of the alternator 18. However, if the ECU 28 determines that a measured alternator voltage is less than the stored reference voltage (step 520—YES), than the ECU 28 may perform a corrective action (step 530). The corrective action may be any action that increases a power output of the alternator 18.

For example, the ECU 2.8 may perform a corrective action by increasing a speed of the alternator 18 to increase a power output of the alternator 18. In one example, the ECU 28 may increase a speed of the alternator 18 to a capability speed, which may be a rated speed at which the alternator 18 is capable of providing power to meet any electrical load 22 that the machine 10 is likely to produce during normal operation. In one example, the ECU 28 may increase the speed of the alternator 18 by increasing a speed of the engine 12. The ECU 28 may transmit a signal to the engine 12 to increase its speed to a speed that will cause the alternator 18 to operate at its capability speed. In some embodiments, the ECU 28 may perform a safety check (e.g., determine whether a parking brake is on) before increasing a speed of the engine 12. It should be understood, however, that the corrective action may be any action that increases a power output of the alternator 18.

Through the exemplary disclosed processes 400 and 500, a power management system may automatically calibrate an overloading threshold and use the overloading threshold to accurately control an alternator to provide enough power to meet an electrical load. In this way, conditions that cause a large electrical load (e.g., cold conditions, engine idling), and which may otherwise cause a drain on a battery, may be met by an alternator alone. Thus, the disclosed power management system may be accurately and efficiently implemented on many different machines, thereby promoting improved battery life in those machines.

It will be apparent to those skilled in the art that various modifications and variations can be made to the power management system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A power management system, comprising:
an alternator; and
an electronic control unit configured to:
measure an operating voltage of the alternator across at least one load when the alternator is operating at a capability condition,
the capability condition indicating that the alternator is operating with a particular speed when the alternator is not overloaded;
determine a threshold voltage of the alternator based on the operating voltage when the alternator is operating at the capability condition,
when determining the threshold voltage, the electronic control unit is configured to determine the threshold voltage based on the operating voltage and a tolerance factor associated with the alternator operating at the capability condition,
the threshold voltage being determined each time the alternator returns to operating at the capability condition after not operating at the capability condition;
monitor a voltage of the alternator; and
when the monitored voltage is less than the threshold voltage, perform a corrective action to increase a power output of the alternator.

2. The power management system of claim 1, wherein the particular speed is within a predetermined range.

3. The power management system of claim 2, wherein the predetermined range is approximately two to five times an alternator idling speed.

4. The power management system of claim 1, wherein the particular speed is equal to or greater than a predetermined threshold.

5. The power management system of claim 4, wherein the predetermined threshold is approximately two times an alternator idling speed.

6. The power management system of claim 1, wherein the capability condition includes an electrical load on the alternator that is less than a predetermined threshold.

7. The power management system of claim 1, wherein, when determining the operating voltage, the electronic control unit is configured to determine an average of voltages measured across the at least one load while the alternator operates according to the capability condition for a predetermined period of time.

8. The power management system of claim 1, wherein the tolerance factor is based on a range of normal output voltage variation of the alternator when the alternator is to operating at the capability condition.

9. The power management system of claim 1, wherein, when performing the corrective action, the electronic control unit is configured to increase a speed of the alternator.

10. The power management system of claim 9, wherein:
the alternator is operably coupled to an engine, and
when performing the corrective action, the electronic control unit is configured to increase a speed of the engine to increase the speed of the alternator.

11. A method of managing a power output of an alternator, the method comprising:
measuring an operating voltage of the alternator across at least one load when the alternator is operating at a capability condition,
the capability condition indicating that the alternator is operating at a particular speed when the alternator is not overloaded;
determining a threshold voltage based on the operating voltage and a tolerance factor, when the alternator is operating at the capability condition,
the tolerance factor being associated with the alternator operating at the capability condition,
the threshold voltage being determined each time the alternator returns to operating at the capability condition after not operating at the capability condition;
monitoring a voltage of the alternator; and
when the monitored voltage is less than the threshold voltage, increasing a speed of the alternator to increase the power output of the alternator.

12. The method of claim 11, wherein the particular speed is within a predetermined range that is based on an alternator idling speed.

13. The method of claim 11, wherein the particular speed is equal to or greater than a predetermined threshold that is based on an alternator idling speed.

14. The method of claim 11, wherein the capability condition includes an electrical load on the alternator that is less than a predetermined threshold.

15. The method of claim 11, wherein determining the operating voltage includes determining an average of voltages measured across the at least one load while the alternator operates according to the capability condition for a predetermined period of time.

16. The method of claim 11, wherein the tolerance factor includes a range of normal output voltage variation of the alternator when the alternators is operating at the capability condition.

17. A machine, comprising:
an engine;
an alternator operably coupled to the engine; and
an electronic control unit configured to:
measure an operating voltage of the alternator across at least one load when the alternator is operating at a capability condition,
the capability condition indicating that the alternator is operating with a particular speed when the operator is not overloaded;
determine a threshold voltage based on the operating voltage and a tolerance factor associated with the alternator operating at the capability condition, when the alternator is operating at the capability condition,
the threshold voltage being determined each time the alternator returns to operating at the capability condition after not operating at the capability condition;
monitor a voltage of the alternator; and
when the monitored voltage of the alternator is less than the threshold voltage, increase a speed of the engine to increase a power output of the alternator.

* * * * *